July 22, 1930. W. C. KIRKPATRICK 1,770,984
APPARATUS AND PROCESS FOR DISTILLING CARBONACEOUS MATERIALS
Original Filed Aug. 4, 1921 5 Sheets-Sheet 1

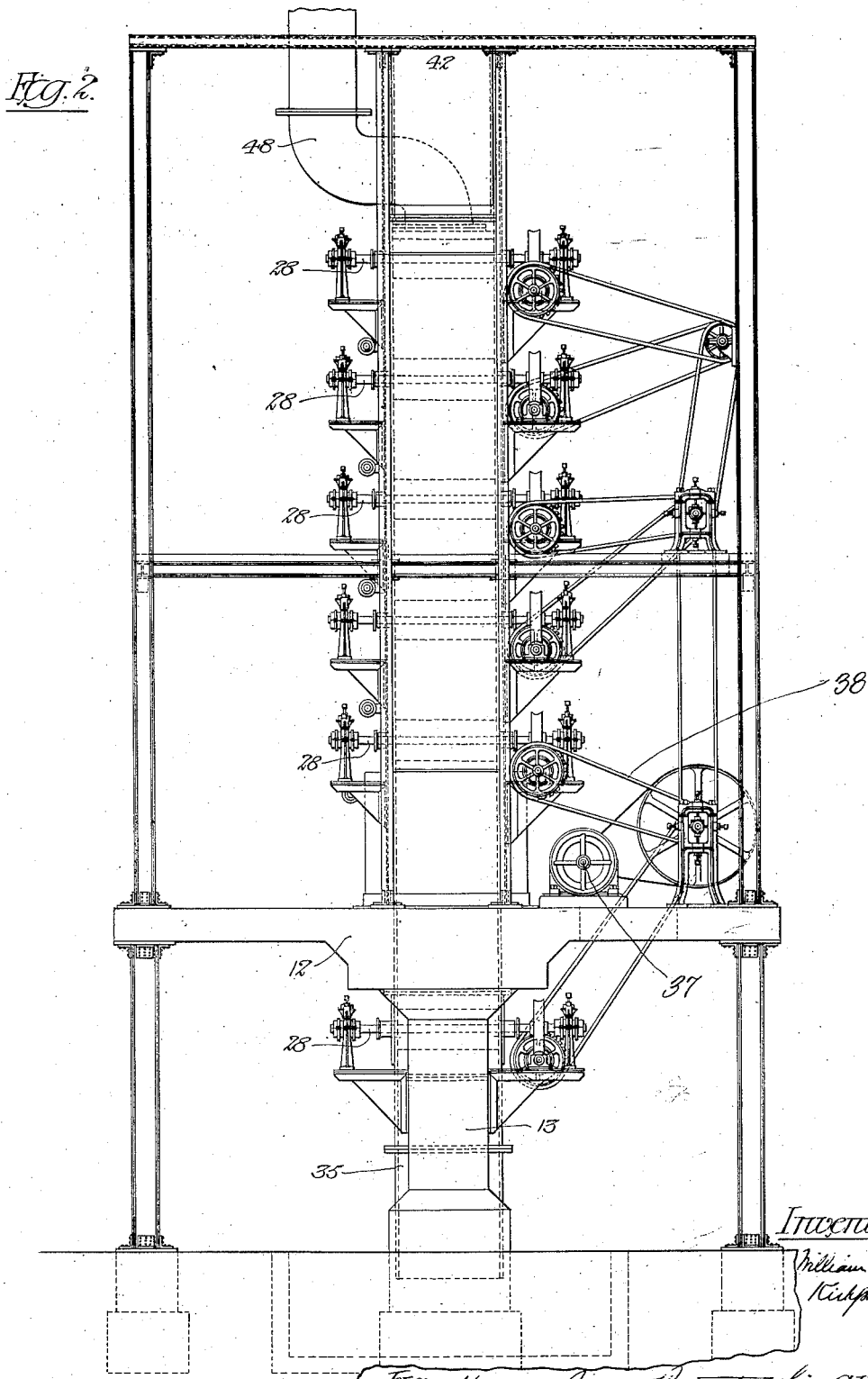

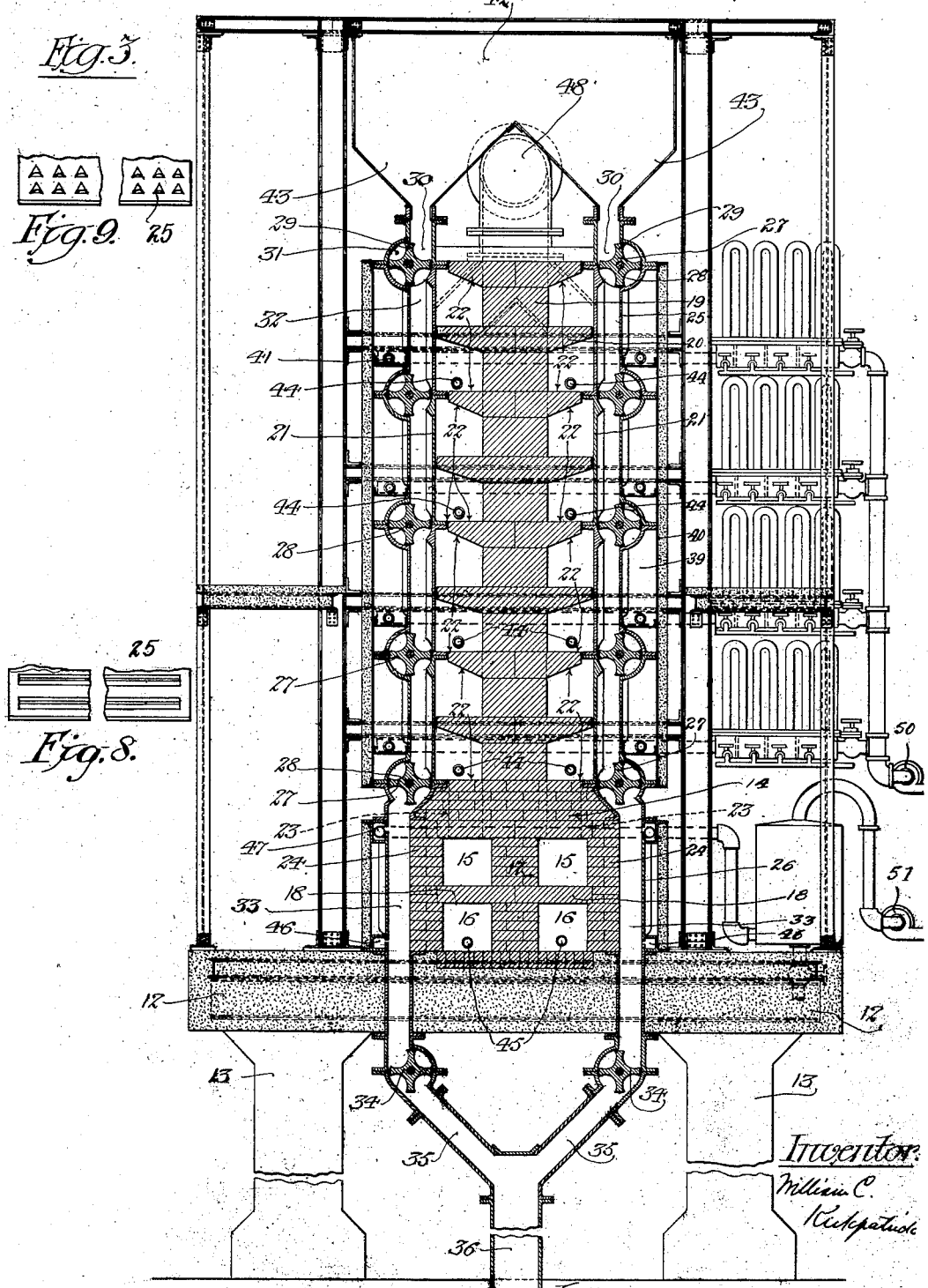

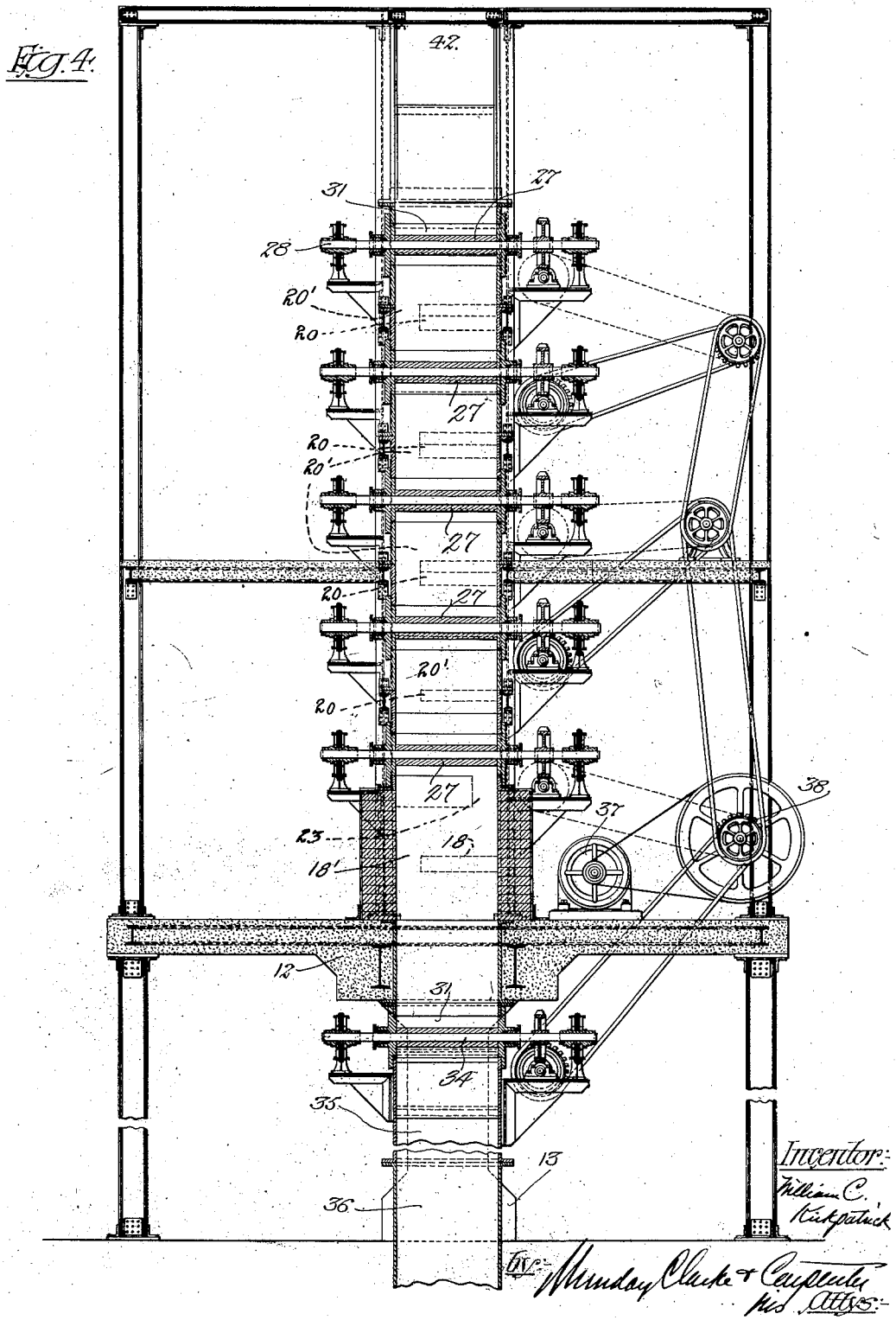

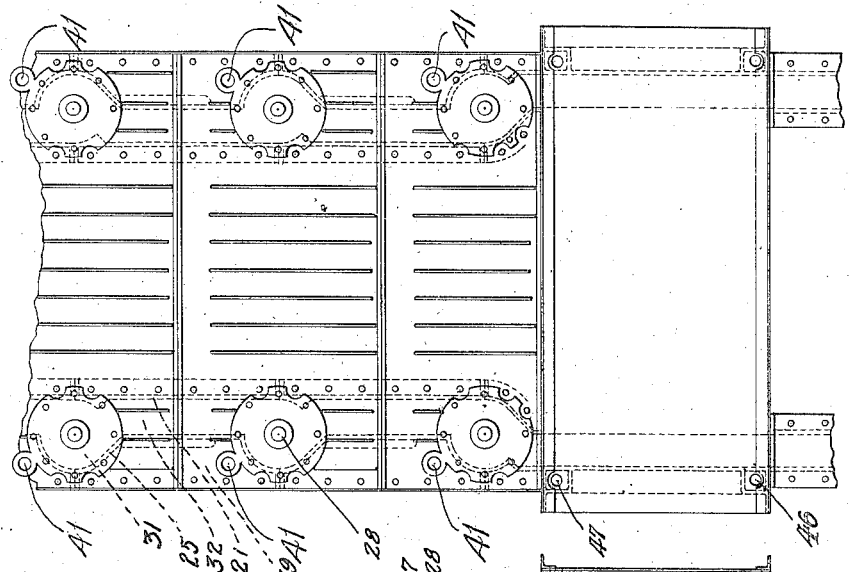

Patented July 22, 1930

1,770,984

UNITED STATES PATENT OFFICE

WILLIAM C. KIRKPATRICK, OF CHICAGO, ILLINOIS, ASSIGNOR TO THE WESTERN GAS CONSTRUCTION COMPANY, OF FORT WAYNE, INDIANA, A CORPORATION OF INDIANA

APPARATUS AND PROCESS FOR DISTILLING CARBONACEOUS MATERIALS

Application filed August 4, 1921, Serial No. 489,854. Renewed December 15, 1923.

This invention relates to the treatment of carbonaceous materials, such for example as oil-bearing shale; the invention has for objects to effect the continuous distillation of such materials, and, during the distillation, to prevent the distillates from being subjected to temperatures higher than the temperatures at which the distillates are evolved and to withdraw such distillates immediately into a zone of lower temperature, thereby preventing cracking of the distillates into fixed gases; and further to provide for the recovery of the distillates in different fractions by progressively subjecting the material being distilled to successively higher temperatures and separately recovering the distillates evolved at the different temperatures. The invention further comprehends the treatment of the material for the recovery of ammonia after the distillation of the hydrocarbons from the material has been completed.

In addition to the general objects recited above, the invention has for further objects such other improvements or advantages in construction, operation and results as are found to obtain in the apparatus and processes hereinafter described or claimed.

In the accompanying drawings, forming a part of the specification, and showing, for purposes of exemplification, a preferred form and manner in which the invention may be embodied and practiced, but without limiting the claimed invention specifically to such illustrative instance or instances;

Fig. 2 is an end elevation of the same;

Fig. 3 is a vertical section taken through the retorts and the combustion chambers;

Fig. 4 is another vertical sectional elevation taken transversely to Fig. 3 through one of the retorts; and Figs. 5, 6 and 7 are enlarged detail views illustrating the preferred wall construction of the retort.

Figure 1:
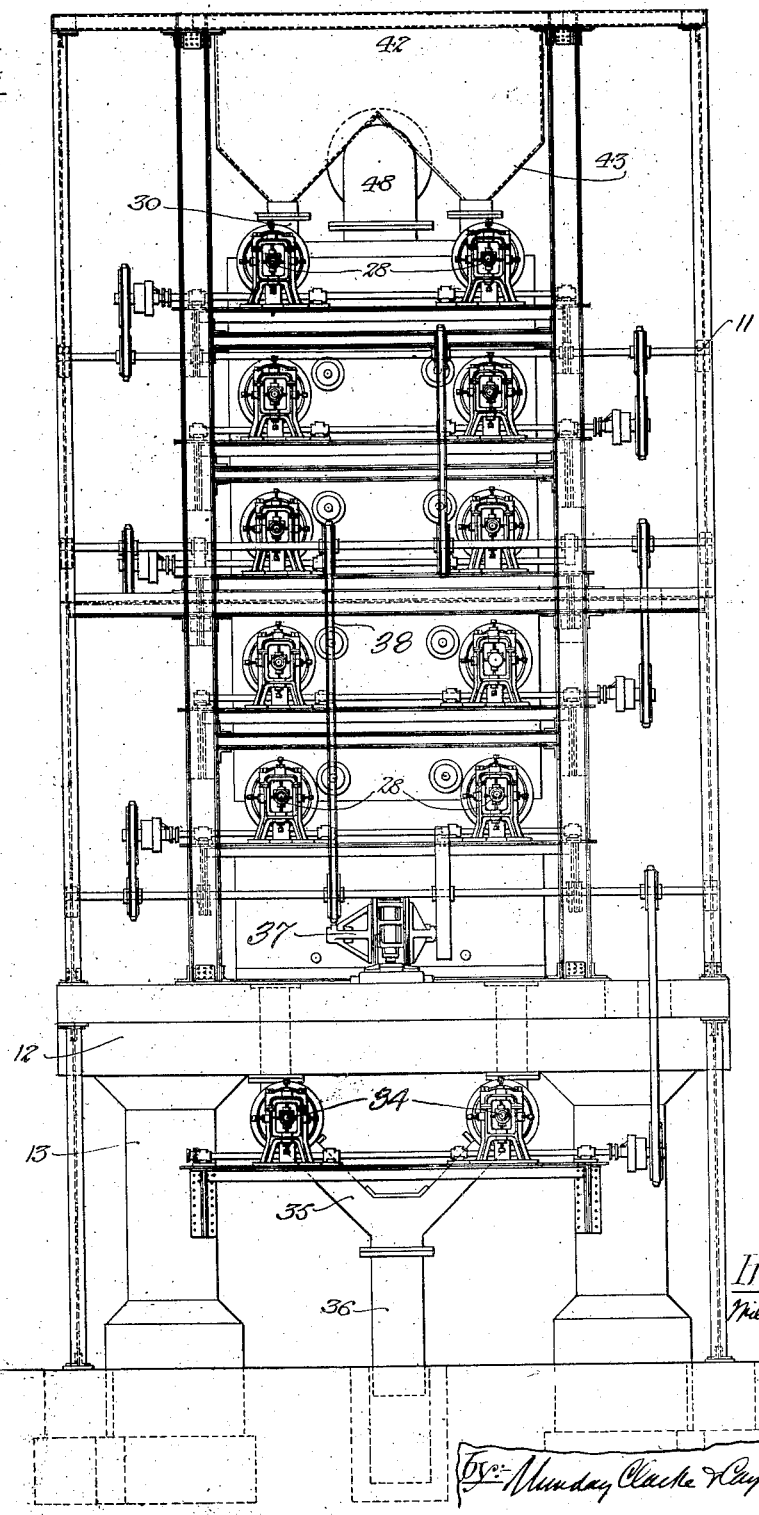
Fig. 1 is a side elevational view of a retort construction especially designed for practicing the improved process of the present invention.

Fig. 8 is a view of a portion of walls 25 for the lowermost retorts 32 showing more particularly elongated slots, for withdrawal of gaseous vapors or distillates, formed by pressing portions of the walls 25 inwardly toward the retort space to provide a slope over which the material passes.

Fig. 9 is a view of a portion of walls 25 for the upper retorts 32 showing openings which are shaped like a small sector of a circle but in a horizontal plane, for withdrawal of gaseous vapors or distillates, formed by pressing portions of the walls 25 inwardly towards the retort space to provide a slope over which the material passes.

The same characters of reference designate the same parts in each of the several views of the drawings.

In the present embodiment, the invention is applied to the treatment of oil-bearing shale, and, for convenience, the present description will be confined to this use of the invention. Features of invention, are, however, susceptible of other valuable applications; consequently the scope of the invention is not confined to the specific use and specific embodiment herein described as an illustrative example.

Referring to the drawings which illustrate a structural embodiment of apparatus for carrying out the improved distilling process of the invention, there is shown at 11 a supporting frame work in which the various instrumentalities and structures of the retort construction are supported. At the bottom the frame work rests upon a heavy platform 12 and the latter in turn is supported by the heavy pillars 13. Resting on the aforesaid platform 12 is a lower furnace or combustion chamber construction 14, built up of refractory material and having two pairs of upper and lower combustion chambers 15 and 16, one pair 15, 16 of such chambers being separated from the other by the median refractory wall 17. Horizontal baffles 18 are provided between each pair of combustion chambers 15 and 16, said baffles 18 each having outlets 18' at one end, as indicated by dotted lines in Fig. 4, to permit the hot gases from a lower combustion chamber 16 to pass into and circulate through the upper combustion chamber 15.

Supported on the top of the lower furnace 14 and directly above the median dividing wall 17 is a vertical dividing wall 19, at spaced intervals of which are located baffles 20. Each baffle 20 is staggered with respect to its next adjacent baffle, as indicated by dotted lines in Fig. 4, to provide ports 20' for the flow of gases from the space between one pair of baffles into the space above them and also to insure travel of the hot gases throughout the entire length of the combustion space between each pair of baffles. As shown in Fig. 3, the baffles extend sidewise to the opposite vertical side walls 21. These walls 21 together with the baffles 20 and the opposite end walls of the central partition 19 enclose two series of superposed combustion chambers. Each such series of combustion chambers is grouped into pairs 22 of which each pair comprises a lower combustion chamber and an upper combustion chamber. As shown in Fig. 3, a series of pairs of combustion chambers 22 is located above each pair of combustion chambers 15, 16, of the lower furnace, the extreme lower chamber 22 communicating with the corresponding upper chamber 15 by means of a duct indicated by dotted lines at 23.

The retorts in which the shale is treated are located respectively beyond the opposite side walls 21 of the upper furnace and the opposite side walls 24 of the lower furnace. The inside walls of such retorts are formed respectively by the vertical walls 21 and 24 and the outside walls are formed by wall plates 25, in the upper portion of the furnace, spaced apart from said walls 21 a sufficient distance to enclose a long relatively narrow body of shale, and, in the lower part of the furnace construction by similarly spaced wall plates 26. The wall plates 25 and 26 are secured together in any suitable manner to form a continuous vertical wall structure.

Located at intervals in the space between each wall 21 and the wall plate structure 25 are rotary conveyer members 27 mounted on the horizontal axes 28. Each rotary conveyer member comprises a plurality of wings 29, in the present instance four, which wings extend parallel with the axis 28 and provide between them long pockets 30 for receiving the shale. The several conveyer members 27 work in recessed portions 31 in the wall construction 25 and in the retort space between said wall construction 25 and the inner wall 21. As shown in Fig. 3, the several conveyer members 27 provide a series of retort chambers 32 on the outside of each vertical wall 21 contiguous to the pairs of combustion chambers 22. The conveyer members 27 at the bottoms of the lowermost retort chambers of the series 32 separate said chambers from retort chambers 33 which receive heat respectively from the pairs of combustion chambers 15 and 16. The material from said chambers 33 is discharged by similar rotary conveyer members 34, located below the platform 12 into the discharge channels 35 which fork into a central discharge chute 36. Each such conveyer member 27 functions to feed the shale from an upper retort chamber into a lower retort chamber and yet substantially to prevent the escape of distillate or gases from a lower retort chamber into the upper one. The conveyer members 27 thus, in addition to their feeding action, function to divide the retort space on each side of the combustion chambers into retort chambers which have the character of separate retorts.

A motor 37 is provided for driving the several conveyer members 27 and 34, and for this purpose belt and reducing gearing connections designated generally by the reference character 38 connect each conveyer member with said motor. The belts and gearing are in proper ratio to impart a uniformly slow continuous rotary movement to each conveyer member.

For discharging the distillate directly from each mass of shale in each retort chamber 32, each such chamber communicates with a distillate chamber 39 located on the outside of the contiguous retort chamber and having its inside wall formed by the outer plate 25 of the retort chamber and its outside wall formed by the outer end wall 40 of the retort assembly. Communicating with each distillate chamber is an outflow pipe 41, within which is maintained a suction by means of any suitable type of exhaust, such as the exhauster 50. With this construction, the atmosphere in each distillate chamber 39 is kept at a reduced pressure relatively to the pressure within the contiguous retort chamber, with the result that the distillates pass directly from the distilling mass of shale into the relatively cooler distillate chamber, the outer wall of which is exposed to the outside atmosphere and cracking of the fractional distillate discharged into that chamber is avoided. In the preferred form of the invention a rapid discharge of the distillate is effected by making each wall plate 25 foraminous, i. e. with many discharge outlets, that permit immediate flow of the distillate as formed in the shale from the distilling retort chamber directly into the distillate chamber.

In carrying out the improved distillation process of the invention, the material to be treated, such as shale is preferably ground to remove lumps, and the ground shale is then deposited into a hopper 42 having chutes 43 through which the shale is continuously delivered to both series of retort chambers 32 of the retort assembly. Passing through the upper pair of conveyer members 27, the shale is delivered to the two upper retort chambers 32. Individual control of the heating for each retort chamber of both the series of the retort assembly is provided by equipping each pair of combustion chambers 22 with an individual gas burner pipe 44 through which a regulable supply of fuel gas may be delivered to the lower combustion chamber 22 of the pair. Each pair of combustion chambers 15, 16 of the lower furnace is similarly equipped with an individual gas burner pipe 45 for supplying a regulable flow of fuel gas.

In the upper retort chamber, a temperature of about 300° F. is maintained by the heat extraneously developed in the contiguous pair of combustion chambers, and such heat, which is applied laterally to the inner vertical side of the mass of shale alongside the walls 21 in the retort chamber effects a progressive distillation beginning with the hot side of the mass of shale and progressing toward its cooler outer vertical side alongside the walls 25. As the heating progresses from the inner vertical side of the shale mass toward its outer cooler side the forming distillates pass laterally out of the mass of shale, in advance of the heat, directly into the contiguous distillate chamber because of the reduced pressure maintained in said chamber, with the result that cracking of the distillate is avoided and a maximum distillate recovery is effected.

From the upper retort chamber of the retort series the masses of shale are delivered by the next pair of conveyer members into the next lower retort chambers in which a higher temperature is maintained, approximately 450° F., to effect the evolution of the fractional distillates which are given off at such temperatures. The application of heat, however, and the withdrawal of the distillate in these chambers proceeds in exactly the same manner as that hereinabove described. In the third lower retort chambers similar heating of the shale masses is effected but at between 500° F. to 600° F. to effect the recovery of the next higher fractional distillates and in the fourth and lowermost distillate chambers, the temperature is carried up to approximately 750° F. to 800° F. to recover the next higher fractional distillates.

Finally the shale masses traveling downwardly at the opposite ends of the furnace assembly are delivered by the lower conveyer members 27 into the two retort chambers 33 which are respectively located at the opposite sides of the pairs of combustion chambers 15, 16 of the lower furnace. In such retort chambers the temperature is carried up to between 1500° F. to 2000° F. and the recovery of the ammonia from the shale mass is effected. For this purpose, a steam supply chest 46 having an inlet leading into its corresponding chamber to permit the steam to circulate through the mass of shale in the chamber, is provided at the lower end of each chamber 33. The addition of the steam effects a decomposition of the nitrogen constituent of the shale and the ammonia vapor thereby evolved passes out through the ammonia discharge pipes 47 which communicate with the retort chambers 33 at their upper ends. An exhauster 51 insures discharge of the ammonia vapor.

From the ammonia recovery retort chambers 33 the shale masses drop to the discharge members 34 and by them are delivered into the discharge pipes 35 and thence into the chute 36, the latter being preferably provided with a water seal to prevent the entry of free oxygen into the retort chambers. The exhaust gases and waste products of combustion from the several series of combustion chambers pass out of the retort assembly through a stack 48 which is communicably connected with the upper pair of combustion chambers 22.

In the operation of the retort the several conveyer members 27 and 34 rotate continuously to effect a substantial continuous travel of the masses of shale through the series of retorts with continuous discharge of the treated shale into the chute 36. But the movement of the shale through the series of retort chambers is slow enough to effect the substantially complete recovery of the several fractional distillates as well as to effect a large ammonia recovery. For example, the shale mass may occupy approximately thirty minutes in traveling through each retort chamber, or a total time of approximately two and one half hours for a given mass of shale to travel from the delivery chute into the discharge chute 36. While facilitating the uniform travel of the shale through the series of retort chambers, the conveyor members nevertheless function to separate the retort chambers from each other and to check the flow of distillate from one retort chamber into another. Consequently there is little danger of the distillate of one fraction mixing with the distillate of another fraction, and it is not necessary to subject the recovered distillates to the usual fractional distillation processes.

The invention as hereinabove set forth may be variously embodied within the scope of the invention hereinafter claimed.

I claim:

1. In a retort construction for distilling carbonaceous materials, in combination: a plurality of superposed combustion chambers, said combustion chambers being grouped into vertically arranged series and the chambers of each series being grouped into pairs; means for separately controlling the heating in each pair of said combustion chambers; a series of long narrow vertical retorts located at the side of each series of combustion chambers, each retort corresponding to and receiving extraneously developed heat from a pair of such combustion chambers; conveyer means interposed at the junction between adjacent retort chambers for feeding material from a higher retort chamber into a lower retort chamber, while acting as a partition separating one retort chamber from another; distillate chambers located at the outer side of the respective retort chambers and communicating with said retort chambers through foraminous walls separating the retort chambers from the distillate chambers, the outer side walls of said distillate chambers being exposed to the outer atmosphere; and means for maintaining in each distillate chamber pressure reduced with respect to that in the contiguous retort chamber; substantially as specified.

2. In a retort construction for distilling carbonaceous materials, in combination: a plurality of superposed combustion chambers, said combustion chambers being grouped into vertically arranged series and the chambers of each series being grouped into pairs; means for separately controlling the heating in each pair of said combustion chambers; a series of long narrow vertical retorts located at the side of each series of combustion chambers, each retort corresponding to and receiving extraneously developed heat from a pair of such combustion chambers; conveyer means interposed at the junction between adjacent retort chambers for feeding material from a higher retort chamber into a lower retort chamber, while acting as a partition separating one retort chamber from another; and distillate chambers located at the outer side of the respective retort chambers and communicating with said retort chambers through foraminous walls separating the retort chambers from the distillate chambers, the outer side walls of said distillate chambers, being exposed to the outer atmosphere; substantially as specified.

3. In a retort construction for distilling carbonaceous materials, in combination: a plurality of superposed combustion chambers, said combustion chambers being grouped into vertically arranged series and the chambers of each series being grouped into pairs; means for separately controlling the heating in each pair of said combustion chambers; a series of long narrow vertical retorts located at the side of each series of combustion chambers, each retort corresponding to and receiving extraneously developed heat from a pair of such combustion chambers; conveyer means interposed at the junction between adjacent retort chambers for feeding material from a higher retort chamber into a lower retort chamber, while acting as a partition separating one retort chamber from another; distillate chambers located at the outer side of the respective retort chambers and communicably connected therewith; and means for maintaining in each distillate chamber pressure reduced with respect to that in the contiguous retort chamber; substantially as specified.

4. In a retort construction for distilling carbonaceous materials, in combination: a plurality of superposed combustion chambers; means for separately controlling the heating in groups of said combustion chambers; a series of long narrow vertical retorts located at the side of said combustion chambers, each retort corresponding to and receiving extraneously developed heat from a group of such chambers; conveyer means interposed at the junction between adjacent retort chambers for feeding material from a higher retort chamber into a lower retort chamber while acting as a partition separating one retort chamber from another; distillate chambers located at the outer side of the respective retort chambers and communicably connected therewith; and means for maintaining in each distillate chamber pressure reduced with respect to that in the contiguous retort chamber, substantially as specified.

5. In a retort construction for distilling carbonaceous materials, in combination: a plurality of superposed combustion chambers in which heat is maintained at different temperatures increasing from the top to the bottom of the series of said combustion chambers; a series of long narrow vertical retorts located at the side of said combustion chambers, said series of retorts receiving progressively higher temperatures from top to bottom of the series; conveyer means interposed at the junction of adjacent retort chambers for feeding material from a higher retort chamber into a lower retort chamber while acting as a partition separating one retort chamber from another; and means for withdrawing the distillate laterally from each retort chamber; substantially as specified.

6. In a retort construction for distilling carbonaceous materials, in combination: centrally located heating means for developing progressively higher temperatures from top to bottom of the retort construction; a series of long narrow vertical retorts located at the side of said heating means in which material is subjected to progressively increasing temperatures; conveyer means interposed at the junction between adjacent retorts for feeding material from a higher retort into a lower one; and distillate outlet means communicably connected with each retort and positioned at the outside of the retort construction for withdrawing the distillate into the cooler atmosphere immediately outside the retorts; substantially as specified.

7. A retort construction for distilling carbonaceous materials, having, centrally located heating means, combined with a plurality of superposed long narrow vertical retorts located at the side of said heating means and with distillate discharge means located at the outside of said retorts for permitting lateral discharge of the distillate from each retort; and means interposed at the juncture between adjacent retorts for controlling the flow from one to the other thereof; substantially as specified.

8. The process of distilling shale which consists in progressively feeding a long narrow vertical gravitatively descending mass of said shale through a series of vertical retort chambers in each of which the evolved distillate is prevented from mixing with the distillate evolved from the other retort chambers; applying progressively increasing temperatures indirectly and laterally to one vertical side of the progressively moving mass of shale; and separately withdrawing the distillate from each retort chamber laterally from the opposite side of the shale mass therein; substantially as specified.

9. The process of distilling shale which consists in progressively feeding a long narrow vertical gravitatively descending mass of said shale through a series of vertical retort chambers in each of which the evolved distillate is prevented from mixing with the distillate evolved from the other retort chambers; applying progressively increasing temperatures indirectly and laterally to one vertical side of the progressively moving mass of shale; and separately withdrawing under reduced pressure the distillate from each retort chamber laterally from the opposite side of the shale mass therein and into a zone of reduced temperature; substantially as specified.

10. The process of distilling shale which consists in progressively feeding a long narrow vertical mass of said shale; applying heat indirectly and laterally to one vertical side of the progressively moving mass of shale; individually controlling such heating at different levels and withdrawing under reduced pressure the distillate laterally from the opposite side of the shale mass and directly into a zone outside the shale mass and of reduced temperature with respect to the temperature of the shale mass and the heat employing for distilling the shale; substantially as specified.

11. The process of distilling shale which consists in progressively feeding a long narrow vertical mass of said shale; controlling the rate of movement of such vertical mass at different levels; applying heat laterally to one vertical side of the progressively moving mass of shale; and immediately withdrawing the distillate laterally from the opposite side of the shale mass and directly into a zone outside the shale mass and of reduced temperature with respect to the temperature of the shale mass and the heat employed for distilling the shale; substantially as specified.

12. The process of distilling shale which consists in progressively feeding a long narrow vertical mass of said shale; controlling the rate of movement of such vertical mass at different levels; applying progressively increasing temperatures laterally to one vertical side of the progressively moving mass of shale; individually controlling such heating at different levels and separately withdrawing the distillates of different fractions laterally from the opposite side of the shale mass and directly into a zone outside the shale mass and of reduced temperature with respect to the temperature of the shale mass and the heat employed for distilling the shale; substantially as specified.

13. The process of treating shale which consists in progressively feeding a long narrow vertical mass of shale; controlling the rate of movement of such vertical mass at different levels; applying progressively increasing temperatures laterally to one vertical side of the progressively moving mass of shale; individually controlling such heating at different levels, separately withdrawing the distillates of different fractions laterally from the opposite side of the shale mass and directly into a zone outside the shale mass and of reduced temperature with respect to the temperature of the shale mass and the heat employed for distilling the shale, and then introducing steam directly into the shale mass of highest temperature and applying still higher temperatures thereto to effect the evolution and recovery of ammonia vapor; substantially as specified.

14. The process of distilling shale which consists in progressively feeding by gravity a long narrow vertical mass of said shale; controlling the rate of movement of such vertical mass at different levels; applying heat laterally to one vertical side of the progressively moving mass of shale; individually controlling such heating at different levels; withdrawing the distillate laterally from the opposite side of the shale mass and directly into a zone outside the shale mass and of reduced temperature with respect to the temperature of the shale mass and the heat employed for distilling the shale; and then applying heat of higher temperature and concurrently introducing steam directly into the portion of the shale mass of highest temperature to effect the evolution of ammonia vapor; and withdrawing the ammonia vapor from the shale mass; substantially as specified.

15. In a retort construction for distilling carbonaceous materials, in combination: centrally located heating means for developing temperatures that increase progressively from top to bottom of the retort construction; means for separately controlling the heating at different levels from top to bottom of the retort construction, a plurality of superposed long narrow vertical retorts located at the side of said heating means and in which carbonaceous material is subjected laterally to the effect of such temperatures; means for controlling the passage between adjacent vertical retorts and distillate discharging means located on the outside of said retorts for withdrawing the distillate therefrom directly into a zone outside the material being distilled and of reduced temperature with respect to the temperature of such material and the laterally applied heat; substantially as specified.

16. A retort construction for distilling carbonaceous materials, having spaced vertical outside and inside retort walls for confining a vertically-elongated relatively narrow mass of such material during the distillation thereof, heating means located to the side of only the inside wall for applying the entire distilling heat laterally to the said vertically-elongated mass of material, means for separately controlling the heating at different levels of such vertical retort walls; and distillate discharging means directly communicating with the outside wall for immediately withdrawing the distillate laterally from the distilling mass, in advance of the heat penetration and directly into a zone of temperature lower than the temperature of distillation; substantially as specified.

17. The process of distilling shale which consists in: applying extraneously-developed distilling heat indirectly and laterally to one side only of a gravitatively descending vertically-elongated mass of shale that is relatively narrow in the direction of heat penetration, and withdrawing the distillate laterally from the other side of the shale mass through the relatively cooler portion of the shale in advance of the advancing heat and directly passing said distillate, without further exposure either to the heat of the distilling shale or to the said extraneously-developed heat, into a zone of temperature lower than the temperature of distillation; substantially as specified.

18. The process of distilling shale which consists in: applying extraneously-developed distilling heat at progressively increased temperatures indirectly and laterally to one side only of a vertically-elongated mass of shale that is relatively narrow in the direction of heat penetration controlling such heating individually at different levels, and withdrawing fractional distillates laterally from the other side of the shale mass through the relatively cooler portion of the shale in advance of the advancing heat and directly passing said distillates, without further exposure either to the heat of the distilling shale or to the said extraneously-developed heat, into a zone of temperature lower than the temperature of distillation; substantially as specified.

19. The process of distilling shale which consists in: applying extraneously-developed distilling heat laterally to one side only of a vertically-elongated mass of shale that is relatively narrow in the direction of heat penetration controlling such heating individually at different levels; withdrawing the distillate laterally from the other side of the shale mass through the relatively cooler portion of the shale in advance of the advancing heat and directly passing said distillate, without further exposure either to the heat of the distilling shale or to the said extraneously-developed heat, into a zone of temperature lower than the temperature of distillation; then applying heat of higher temperature and concurrently introducing steam directly into the portion of the shale mass of highest temperature to effect the evolution of ammonia vapor; and withdrawing the ammonia vapor from the shale mass; substantially as specified.

20. A retort construction for distilling carbonaceous materials, having spaced vertical outside and inside retort walls for confining a vertically-elongated relatively narrow mass of such material during the distillation thereof and adapted to have the charge pass through them by gravity, heating means located to the side of only the inside wall for applying the entire distilling heat indirectly and laterally to the said vertically-elongated mass of material, and distillate discharging means directly communicating with the outside wall for immediately withdrawing the distillate laterally from the distilling mass, and directly into a zone of temperature lower than the temperature of distillation; substantially as specified.

21. The process of distilling shale which consists in: applying extraneously-developed distilling heat indirectly and laterally to the inner side of a gravitatively descending vertically-elongated mass of shale that is relatively narrow in the direction of heat penetration, and withdrawing the distillate laterally from the outer side of the shale mass and directly passing said distillate, without further exposure either to the heat of the distilling shale or to the said extraneously-developed heat, into a zone of temperature lower than the temperautre of distillation; substantially as specified.

22. In a retort construction for heat treating materials, in combination: centrally located heating means for developing temperatures that increase progressively from top to bottom of the retort construction; means for separately controlling the heating at different levels from top to bottom of the retort construction, a plurality of superposed long narrow vertical retorts located at the side of said heating means and in which the material is subjected laterally to the effect of such temperatures; means for controlling the passage between adjacent vertical retorts and gaseous vapor discharging means located on the outside of said retorts for withdrawing gaseous vapor therefrom directly into a zone outside the material from which it was released and of reduced temperature with respect to the temperature of such material from which the gaseous vapor was released and the laterally applied heat; substantially as specified.

In testimony whereof I have hereunto set my hand, this 25th day of July, 1921.

WILLIAM C. KIRKPATRICK.